Figure 4:
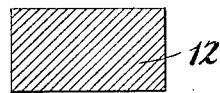

Aug. 26, 1924.
R. A. KLATT
1,506,309
TIRE MOUNTING FOR WHEELS
Filed June 22, 1922   2 Sheets-Sheet 1
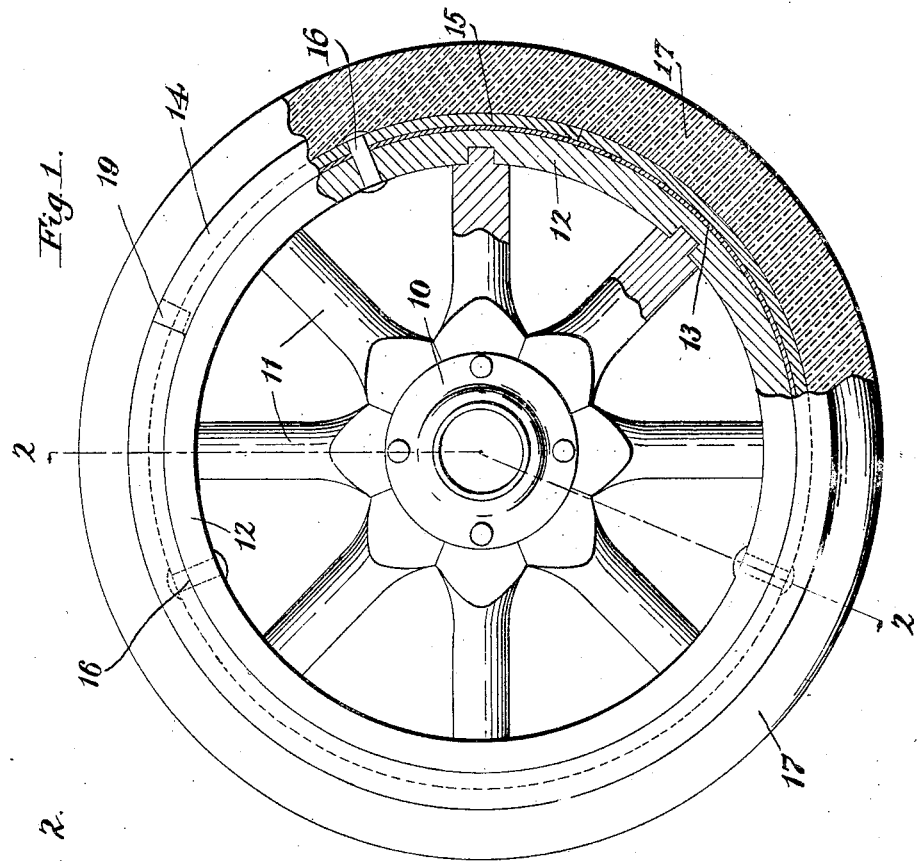
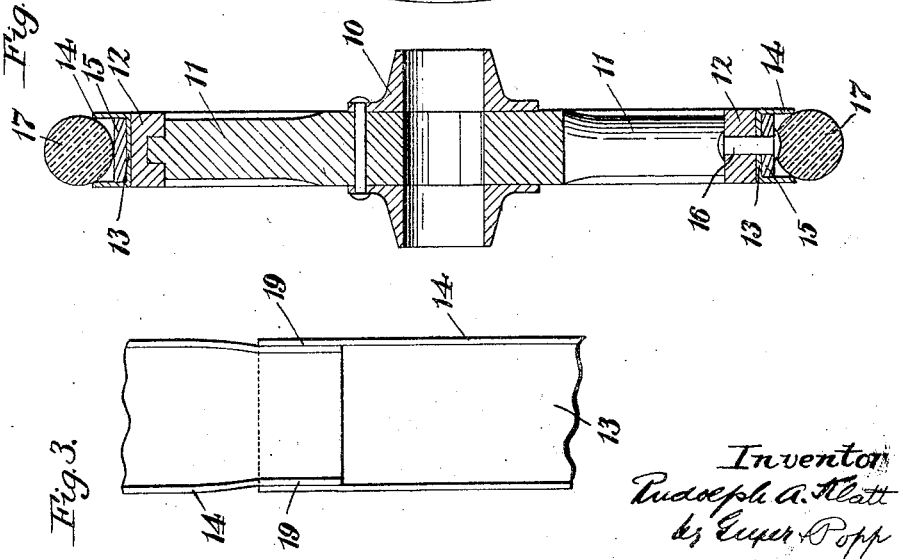
Inventor
Rudolph A. Klatt
by Guyer Popp
Attorneys Aug. 26, 1924.

R. A. KLATT 1,506,309

TIRE MOUNTING FOR WHEELS

Filed June 22, 1922    2 Sheets-Sheet 2

Inventor:
Rudolph A. Klatt
by Geyer & Popp
Attorneys

Patented Aug. 26, 1924.

1,506,309

UNITED STATES PATENT OFFICE.

RUDOLPH A. KLATT, OF TONAWANDA, NEW YORK, ASSIGNOR TO AUTO-WHEEL COASTER COMPANY, INC., OF NORTH TONAWANDA, NEW YORK, A CORPORATION OF NEW YORK.

TIRE MOUNTING FOR WHEELS.

Application filed June 22, 1922. Serial No. 570,119.

*To all whom it may concern:*

Be it known that I, RUDOLPH A. KLATT, a citizen of the United States, residing in Tonawanda, in the county of Niagara and State of New York, have invented new and useful Improvements in Tire Mountings for Wheels, of which the following is a specification.

This invention relates to a tire mounting for wheels which are more particularly designed for use on toy wagons or wheeled coasters, although the same may also be employed to advantage in larger wagons used for commercial or other purposes.

It is the purpose of this invention to provide an improved means for mounting a tire for wheels of this character which is strong, light and durable, neat and attractive in appearance, not liable to get out of order and capable of being produced at low cost.

In the accompanying drawings:

Figure 1 is a side elevation, partly in section, of a wheel equipped with my improved tire mounting. Figure 2 is a section of the same taken on line 2—2, Fig. 1. Figure 3 is a fragmentary plan view of the channel of the tire mounting showing the joint therein. Figures 4, 5, 6, 7, 8 and 9 are sectional views showing the manner of building up or assembling the tire mounting in accordance with my invention:

Similar characters of reference refer to like parts throughout the several views.

This tire mounting may be embodied in wheels of different constructions than shown in the drawings comprising a hub 10, spokes 11 radiating from the hub and an annular felloe 12 secured to the outer ends of the spokes. The latter and the felloe in this instance are constructed of wood.

Arranged on the outer side of the felloe is an annular channel which has its hollow side facing outwardly. This channel is preferably made of comparatively light sheet metal and comprises a cylindrical web 13 resting on the periphery of the felloe and two annular flanges 14 projecting outwardly from opposite edges of the web. The external width of this channel is equal to the width of the felloe and these parts are assembled so that the flanges of the channel are flush with the side of the felloe, thereby giving the wheel a good finished appearance.

Within the channel is arranged an annular retaining band 15 of comparatively heavy metal which is equal in width to the interior of the channel so the same fits snugly into the latter and sustains the flanges thereof against inward deflection, when subjected to side strains in this direction.

The felloe, channel and retaining band may be connected with each other by any suitable means for instance by rivets 16 passing at intervals through the band, felloe and web of the channel, as shown in Figs. 1, 2, 7, 8 and 9.

Figure 9:
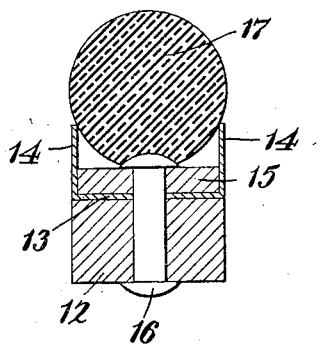

Arranged between the flanges of the channel and resting on the retaining band is a tire 17 which may be of any suitable construction but is preferably made of rubber which is round in cross section, as shown in Figs. 2 and 9, and in the form of an endless ring, as shown in Fig. 1.

Figure 7:
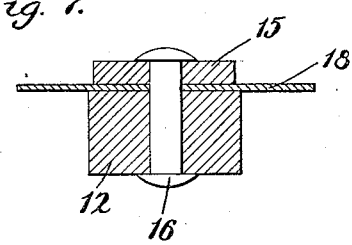
Figure 5:
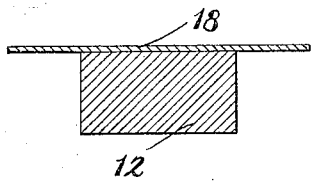
Figure 8:
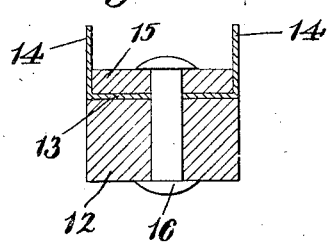
Figure 6:
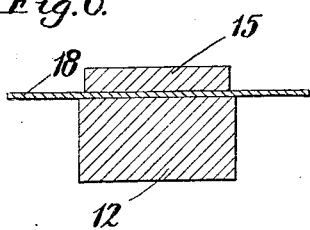

Preparatory to adding my improvements to a wheel the outer side or periphery of the felloe is cylindrical and unobstructed, as shown in Fig. 4. A sheet of metal 18 is now placed around the felloe so that the same forms a cylinder the opposite edges of which project laterally beyond the sides of the felloe, as shown in Fig. 5. The retaining band is next placed around the sheet metal 18 so that the central part of the latter is arranged between the felloe and band, as shown in Fig. 6. A suitable number of rivets 16, or other fastenings are next passed through the band and felloe and the intervening part of the sheet of metal 18, as shown in Fig. 7. Thereafter the longitudinal edge portions of the sheet of metal 18 are turned outwardly by suitable tools so these edge portions are arranged at right angles to the face of the band and are flush with the sides of the felloe, as shown in Fig. 8. The metal 18 of which the channel is formed preferably is originally in the shape of a strip which upon being wrapped around the felloe forms a split ring the ends of which lap one over the other and when this strip is finally converted into a channel the latter is split but one end thereof telescopes into the other end of the same, as shown at 19, in Figs. 1 and 3, thereby producing practically a continuous annular channel. Into this channel the endless rubber tire is finally sprung so that the latter occupies the position shown in Figs. 2 and 9 and is held reliably against displacement therein without requiring any additional fastening.

A tire mounting thus constructed furnishes the maximum strength for the amount of metal employed in its fabrication, the same can be readily assembled and built without the use of expensive equipment and when completed the same possesses great rigidity and is capable of standing the severest strains to which the same may be subjected while in use.

Furthermore, owing to the extremely low cost of this tire mounting the same is especially well suited for use in toy or play wagons for children in which economy of manufacture is an important element, inasmuch as the selling price must be within reach of the customers.

I claim as my invention:

A tire mounting for a wheel having a felloe, comprising a channel adapted to be arranged on said felloe with its trough facing outwardly, a metal band engaging with the bottom of the trough of said channel, an elastic tire arranged in the trough of said channel and resting on said band, and means adapted to connect said felloe, band and channel, said tire resting freely in said channel and being disconnected from said felloe.

RUDOLPH A. KLATT.